United States Patent
Kjeldaas (10) Patent No.: US 8,593,501 B1
(45) Date of Patent: Nov. 26, 2013

(54) VOICE-CONTROLLED LABELING OF COMMUNICATION SESSION PARTICIPANTS

(71) Applicant: Alexander Kjeldaas, Saltsjo-Boo (SE)

(72) Inventor: Alexander Kjeldaas, Saltsjo-Boo (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/659,639

(22) Filed: Oct. 24, 2012

Related U.S. Application Data (60) Provisional application No. 61/599,755, filed on Feb. 16, 2012.

(51) Int. Cl.
*H04N 7/15* (2006.01)
(52) U.S. Cl.
CPC ...................................... *H04N 7/15* (2013.01)
USPC .................. 348/14.01; 348/14.08; 348/14.12; 704/235
(58) Field of Classification Search
USPC ......... 348/14.01–14.16; 704/235; 379/202.01
See application file for complete search history.

(56) References Cited

U.S. PATENT DOCUMENTS

| | | | | |
|---|---|---|---|---|
| 6,020,915 A | * | 2/2000 | Bruno et al. | 348/14.09 |
| 8,380,521 B1 | * | 2/2013 | Maganti et al. | 704/275 |
| 2008/0319745 A1 | * | 12/2008 | Caldwell et al. | 704/235 |
| 2009/0052646 A1 | * | 2/2009 | McGowan et al. | 379/202.01 |
| 2009/0326939 A1 | * | 12/2009 | Toner et al. | 704/235 |
| 2012/0306992 A1 | * | 12/2012 | Watson et al. | 348/14.07 |

FOREIGN PATENT DOCUMENTS

JP    2009177592 A  *  8/2009

* cited by examiner

*Primary Examiner* — Melur Ramakrishnaiah
(74) *Attorney, Agent, or Firm* — Shumaker & Sieffert, P.A.

(57) ABSTRACT

In general, this disclosure describes techniques for providing identification, such as a name, to participants of a communication session. In one example, a method includes establishing, by a communication device, a communication session between a plurality of devices, wherein a first device of the plurality of devices is identified during the communication session by an identifier associated with a network connection of the first device to the communication session. The method also includes detecting a spoken name associated with the first device that is connected to the communication session and transforming the detected spoken name into at least one character string. The method further includes sending, by the communication device, a representation of the at least one character string to at least a second device of the plurality of devices for display by the second device.

20 Claims, 4 Drawing Sheets

VOICE-CONTROLLED LABELING OF COMMUNICATION SESSION PARTICIPANTS

RELATED APPLICATION

This application claims the benefit of U.S. Provisional Application No. 61/599,755, filed Feb. 16, 2012, the entire content of which is incorporated herein in its entirety.

TECHNICAL FIELD

The disclosure relates generally to multi-participant communication sessions.

BACKGROUND

Two or more users of communication devices may often engage in real-time video communications, such as video conferencing, where the users (also referred to as participants) exchange live video and audio transmissions. Some users may be identified by a number, such as a telephone number, associated with a device used to connected the user to the real-time video communications.

SUMMARY

In one example, techniques of this disclosure provide a method that includes establishing, by a computer having at least one processor and memory, a communication session for multiple communication devices. At least two communication devices participate in the communication session as video communication devices. Each video communication device is configured to provide audio and video for the communication session and each video communication device is also configured to receive audio and video for the communication session. At least one communication device participates in the communication session as an audio communication device, and each audio communication device is configured to provide and receive audio, but not video, for the communication session. The method further comprises connecting a first video communication device to the communication session and connecting a second video communication device to the communication session. The method further includes receiving a request to connect an audio communication device to the communication session and connecting the audio communication device to the communication session. The method also comprises receiving encoded speech from the audio communication device, performing speech recognition on the encoded speech to obtain speech-recognized text, and providing output text associated with the speech-recognized text to at least one of the first and second video communication devices for visual identification of the audio communication device.

Another example of this disclosure provides a computer-readable storage medium comprising instructions for causing a programmable processor to perform operations. The instructions may include establishing, by a computer having at least one processor and memory, a communication session between multiple communication devices, wherein at least two communication devices participate in the communication session as video communication devices, each video communication device is configured to provide audio and video for the communication session, each video communication device is configured to receive audio and video for the communication session, at least one communication device participates in the communication session as an audio communication device, and each audio communication device is configured to provide and receive audio, but not video, for the communication session. The instructions further include receiving encoded speech from at least one of the communication devices, wherein the encoded speech relates to an identifier for the audio communication device, performing speech recognition on the encoded speech to obtain speech-recognized text, and providing output text associated with the speech-recognized text to at least one of the video communication devices for visual identification of the audio communication device.

Yet another example provides a communication device that includes one or more processors and a network interface to connect to a communication session, wherein the communication session connects one or more video communication devices and one or more audio communication devices to the communication device. Each video communication device is configured to provide and receive audio and video for the communication session. Each audio communication device is configured to provide and receive audio, but not video, for the communication session. The one or more processors are configured to detect a spoken name associated with at least one audio communication device, transform the detected spoken name into speech-recognized text, and provide the speech-recognized text to at least one of the video communication devices for visual identification of the audio communication device.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present invention. Like reference characters denote like elements throughout the figures and text.

DETAILED DESCRIPTION

Techniques of the present disclosure are directed at functionality for providing identification, such as a name, as a label for a participant in a communication session. In some communication sessions, such as a real-time video conference or audio conference, text associated with each participant in the communication session may be output by those communication devices that are capable of outputting the text, such as video communication devices. Users of communication devices that support displaying text may be able to discern identities of the other participants in the communication session.

Some communication devices connected to the communication session may provide a name for the participant. Communication devices may be video communication devices or audio communication devices. Each participating video communication device may be configured to provide audio and video for the communication session and may be configured to receive audio and video for the communication session. For example, some video communication devices may include personal computers, smart phones, laptops, personal data assistants (PDAs), tablet computers, and the like. An audio communication device, such as a telephone, cell phone, radio, or the like, may be configured to provide and receive audio, but not video. Any video communication device may act as an audio communication device through not utilizing the video functionalities of the video communication device.

A participant's name may be provided, for example, through user input, login information, or an email account. However, some participants may connect to the communication session using devices that do not provide a name. Such devices may include cell phones, telephones, or any other communication device where this information may not be provided. However, an unnamed participant may be identified in the communication session by an identifier other than a name, such as, for example, a number associated with a network connection used to connect the participant's device to the communication session. For example, if the participant dials in to the communication session or receives a call to join the communication session, the identifier may be a telephone number associated with a phone the participant is using. In another example, an assignment may be made to visually represent the participant, which may be based at least partially on an algorithm. The participant may be notified of the assignment, such as by stated it to the participant. Even though the telephone number may uniquely identify the participant from other participants in the communication session, it may not convey the identity of the participant.

Techniques described herein determine a name associated with a participant from dialogue or text-based communications between the participants during the communication session. For example, if a participant is identified by a phone number, a conference application may listen for a spoken name associated with the participant. When the conference application detects a spoken name, the spoken name may be transcribed. For example, speech recognition may be performed on encoded speech of the spoken name to obtain speech-recognized text. This transcribed name or text may be sent to communication devices engaging in the communication session in order to visually identify the participant with the transcribed name.

Figure 1:
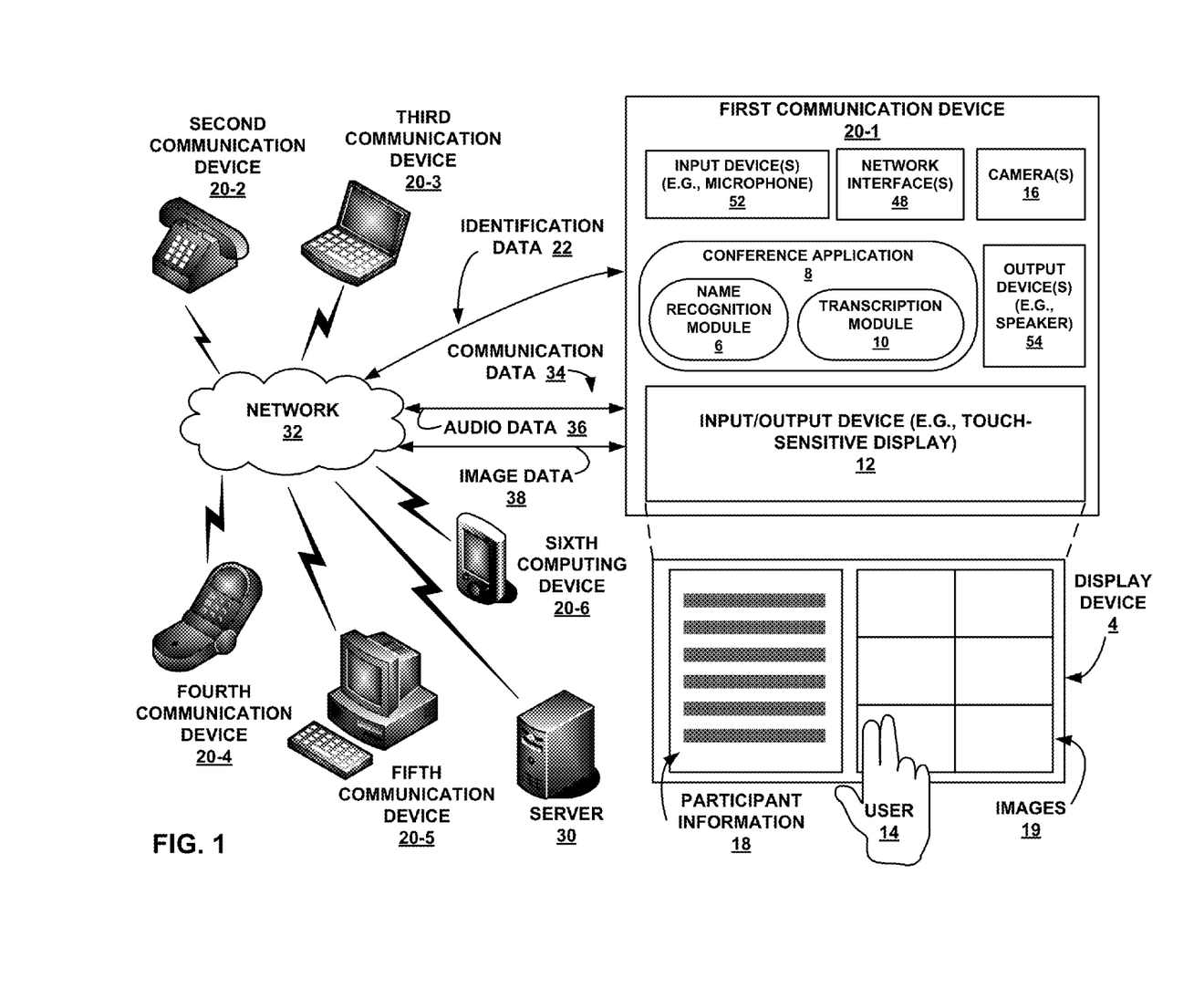
FIG. 1 is a block diagram illustrating an example of a communication device that may execute one or more applications and engage in a communication session with one or more other communication devices, in accordance with one or more aspects of the present disclosure.

FIG. 1 is a block diagram illustrating an example of a first communication device 20-1 that may execute one or more applications (for example, conference application 8) and engage in a communication session with one or more other communication devices 20-2 through 20-6, in accordance with one or more aspects of the present disclosure. As described herein, first communication device 20-1 may simply be referred to as communication device 20-1. As described herein, communication devices 20-1 through 20-6 may be referred to collectively as communication devices 20. One example of communication device 20-1 is more fully described in FIG. 2, discussed below.

Communication device 20-1 may engage in a video conference with a plurality of other participants using other communication devices 20-2 through 20-6. Communication device 20-1 may connect to one or more other communication devices 20-2 through 20-6 through network 32. As illustrated in FIG. 1, other communication devices may include second communication device 20-2, third communication device 20-3, fourth communication device 20-4, fifth communication device 20-5, and sixth communication device 20-6. In further examples, different numbers of communication devices 20-1 through 20-6 may be implemented. For illustrative purposes, FIG. 1 is discussed in terms of a currently ongoing communication session between communication devices 20-1 through 20-6.

Communication device 20-1 may, in some examples, include or be part of a portable communication device (for example, a mobile phone, netbook, laptop, personal data assistant (PDA), tablet device, portable gaming device, portable media player, e-book reader, or a watch) as well as non-portable devices (for example, a desktop computer). Similarly, communication devices 20 may include or be part of a portable communication device as well as non-portable devices. As illustrated, second communication device 20-2 may be a telephone, third communication device 20-3 may be a laptop, fourth communication device 20-4 may be a mobile phone, fifth communication device 20-5 may be a desktop computer, and sixth communication device 20-6 may be a PDA. Any other numbers and combinations of types of communication devices participating in a video conference according to techniques of this disclosure are contemplated. For purposes of illustration only, in this disclosure, first communication device 20-1 is described as a portable or mobile device and second communication device 20-2 is described as a telephone or cell phone, but aspects of this disclosure should not be considered limited to such devices.

Communication device 20-1 may include an input/output device 12 (for example, a touch-sensitive device), one or more input devices 52 (for example, a microphone), one or more cameras 16, and one or more output devices 54 (for example, a speaker). In some examples, input/output device 12 may comprise display device 4. In some examples, display device 4 may be a presence-sensitive screen or a touch screen. In some examples, display device 4 may be capable of receiving touch input from a user 14 (for example, display device 4 may comprise a touch screen, track pad, track point, or the like). User 14 may interact with input/output device 12, for example, by performing touch input on display device 4. In other examples, input/output device 12 may only be an output device. For example, input/output device 12 may be a screen without input capabilities.

Communication device 20-1 may connect to network 32, including a wired or wireless network, via one or more network interfaces 48. Communication device 20-1 may connect to communication devices 20-2 through 20-6, or to any other number of communication devices. Communication devices 20-2 through 20-6 may be connected to network 32 via wired and/or wireless links. Network 32 may include a wide-area network such as the Internet, a local-area network (LAN), an enterprise network, a wireless network, a cellular network, a telephony network, a Metropolitan area network (for example, Wi-Fi, WAN, or WiMAX), plain old telephone service (POTS), one or more other types of networks, or a combination of two or more different types of networks (for example, a combination of a cellular network and the Internet).

In another example, communication device 20-1 may connect to a server 30 through one or more network interfaces 48.

In some examples, the communication session may be hosted on multiple servers 30. Communication devices 20 may send data to or receive data from server 30 via network 32. Server 30 may be any of several different types of computer and/or network devices. For instance, server 30 may be a conventional web server, a specialized media server, a personal computer operating in a peer-to-peer fashion, or another type of network device. In other examples, server 30 may provide conference calling capabilities in accordance with one aspect of this disclosure. For example, server 30 may manage a six-way video conference between communication devices 20-1 through 20-6. In some examples, server 30 performs techniques of the present disclosure and provides names for participants to one or more devices joined in a communication session hosted by server 30.

Communication device 20-1 may be connected to any of the communication devices 20-2 through 20-6 in a peer-to-peer fashion, either directly or through network 32, or both approximately simultaneously. A peer-to-peer connection may be a network connection that partitions tasks or workloads between peers (for example, first communication device 20-1 and second communication device 20-2) without centralized coordination by a server (for example, server 30). Communication devices 20-1 and 20-2 may exchange communication data 34 via a peer-to-peer connection. In other examples, any combination of communication devices 20-1 through 20-6 may communicate in a peer-to-peer fashion.

Although the systems and techniques described herein support conferencing capabilities, for illustrative purposes only, FIG. 1 will be described in terms of a real-time video communication between first communication device 20-1 and communication devices 20-2 through 20-6. However, it is to be understood that the techniques and examples described in accordance with this disclosure apply to communications having any number of two or more participants. Also, for illustrative purposes only, this disclosure refers to participants in the sense that there is a single participant (for example, a user) for each communication device 20. However, it is to be understood that there may be more than one participant for each of communication devices 20. In other examples, any of communication devices 20 may be engaged in a communication session without a user. Throughout this disclosure, "participants" and "users" are used interchangeably.

This disclosure also describes, for illustrative purposes only, each of communication devices 20 as transmitting an audio feed. In some examples, one or more of communication devices 30 may transmit a video feed. For example, second communication device 20-2, a telephone, may provide a single audio feed to communication devices 20 in the communication session. However, it is to be understood that there may be more than one audio or video feed from each of communication devices 20 if the devices support multiple audio or video feeds. For example, more than one user may be using a single communication device, such as, for example, communication device 20-4, to participate in a video conference. In such an example, communication device 20-4 may include more than one input device (for example, two microphones and two cameras). In some examples, two or more participants may be in a conference room together with multiple cameras. Or one participant can approximately simultaneously use multiple cameras, such as when multiple cameras are used to provide stereoscopic images on mobile phones. In such an example, the techniques described in this disclosure may be applied to the additional audio or video feeds in a similar manner, such as if they were from separate communication devices. As used herein, audio and video data may be referred to as "audio" and "video," respectively. Further, as used herein, video may include moving video or still images.

In FIG. 1, communication devices 20 have established a communication session, such as a real-time video communication, referred to herein as a video conference even though not every communication device in the video conference supports video capabilities. For example, some of the devices may be audio-only, such as telephone 20-2.

A user 14 operates first communication device 20-1 as a participant in the video conference, and may be interchangeably referred to herein as a participant or as user 14. Similarly, as described herein for illustrative purposes only, five additional participants operate one of communication devices 20-2 through 20-6. As described above, in other examples, different numbers of participants and different numbers of communication devices 20 may be engaged in the real-time video conference.

In one example, first communication device 20-1 and communication devices 20-2 through 20-6 exchange communication data 34, which may be streamed real-time. In some examples, communication data 34 may include image data 38 and audio data 36. Image data 38 may be any data that can be visually represented on display device 4. Image data 38 may include one or more still images, a video, a document, a visual presentation, or the like. In one example, image data 38 may be one or more real-time video feeds. As described herein, image data 38 may comprise a plurality of image data signals. In some examples, the image data signals may be associated with a participant. In some examples, some communication devices 20-2 through 20-6 communicatively coupled to communication device 20-1 provide at least one image data signal as part of image data 38. However, some of the devices, such as telephone 20-2 and mobile phone 20-4 may not exchange image data with any of the other communication devices 20, but do exchange audio data.

In one example, audio data 36 may include audio feeds from the one or more participants. In some examples, audio data 36 may comprise speech of a participant (for example, a participant using fifth communication device 20-5 may be speaking) As described herein, audio data 36 may comprise a plurality of audio data signals. In some examples, each audio data signal may be associated with a particular participant or device. In some examples, each communication device 20-2 through 20-6 communicatively coupled to communication device 20-1 provides an audio data signal as part of audio data 36. In some examples, audio from different communication devices may be mixed and received at a communication device together, such as communication device 20-1. For example, audio signals might come from all other communication devices 20-2 through 20-6, flow through server 30 wherein the audio signals are mixed, whereupon the mixed signal is sent to communication device 20-1.

In some examples, image data 38 and audio data 36 may be transferred between first communication device 20-1 and communication devices 20-2 through 20-6 over different channels. In other examples, image data 38 and audio data 36 may be transferred over a single channel. In one example, communication data 34 may be transferred using a Real-time Transport Protocol ("RTP") standard developed by the Internet Engineering Task Force ("IETF"). In examples using RTP, image data 38 may have a format such as H.263, H.264, including scalable video coding (SVC), VP8, or another video coding standard. In other examples, other protocols or formats are used. In other examples, some or all of communication data 34 may be transferred encrypted using, such as, for example, Secure Real-time Transport Protocol (SRTP), or any other encrypted transfer protocol.

In one example, communication device 20-1 may generate a portion of image data 38 from one or more cameras 16 and audio data 36 from input device 52 (for example, a microphone). In one example, communication device 20-1 may receive video data from one or more cameras 16. In one example, output from one or more cameras 16 is provided to one or more of communication devices 20-2 through 20-6, in order that image data associated with user 14 may be displayed on one or more of communication devices 20-2 through 20-6. In some examples, communication devices 20 that do not support displaying image data, such as telephone 20-2 and mobile phone 20-4, do not receive image data. Image data associated with user 14 may include any image data user 14 wishes to display during the video conference. For example, camera(s) 16 may be pointed approximately at user 14 in order that other participants in the video conference may see an image of user 14. In other examples, user 14 may direct one or more cameras 16 elsewhere, for example, at a scene or a document.

In one example, image data 38 and audio data 36 may be associated with each other (for example, audio data 36 is diegetic to image data 38). In other examples, image data 38 and audio data 36 may not be associated with each other (for example, audio data 36 is non-diegetic with image data 38, for example, a sound track is played along with image data 38). In some examples, communication data 34 may include both audio data 36 and image data 38; however, in other examples, communication data 34 may include only one of either audio data 36 or image data 38. Further, at any given moment during the real-time video communication, any of communication devices 20 may be sending only audio data 36, only image data 38, or both.

During a communication session, one or more cameras 16 and one or more other input devices 52 of first communication device 20-1 may be activated. For example, user 14 may point camera 16 at her or his face or another object of interest during video mode in order to transmit a video. In some examples, communication device 20-1 may switch between different cameras 16, such as a front-facing camera and a rear-facing camera. Input device 38, such as a microphone, may record and sound incident to the microphone, such as speech from user 14. Communication device 20-1 may, in real-time, send this video data from camera 16 and audio data from input device 52 to one or more of communication devices 20-2 through 20-6. In other examples, image data 38 may be sourced from a variety of inputs besides one or more cameras 16, such as, for example, a slideshow of pictures, a prerecorded video feed, a screencast showing a window, or the like. Similarly, audio data 36 may be sourced from any audio source, for example, a sound file stored on one of communication devices 20.

Communication devices 20 may exchange additional data, including identification data 22. Identification data 22 may be data that provides an identification of the communication devices 20. For example, identification data 22 may comprise a name of a participant of the communication session that is using one of communication devices 20. Identification data 22 may comprise text obtained from speech recognition of encoded speech. In some examples, identification data 22 comprises output text associated with the speech-recognized text, which may be a modification or correction to the speech-recognized text. The name of the participant using one of the communication devices 20 may be determined from signaling the first device to prompt the participant for their name and receiving user input providing the name, from login information used to join the communication session, from a calendar application which may have been used to invite the participant to the communication session, and the like.

In some examples, identification data 22 may comprise an identifier associated with a network connection of the first device to the communication session. For example, telephone 20-2 and mobile phone 20-4 may be dialed-in or dialed-out participants to the communication session, and may be identified in the communication session by their phone numbers. In other examples, one or more of communication devices 20 may be identified by another identifier, such as, for example, an Internet protocol (IP) address. Identification data 22 may be updated when a name associated with one of the participants in the communication session is detected and transcribed. Speech recognition may be performed on the audio data. The name may be spoken or typed, such as in a text-based chat. In some examples, part of a dialog is analyzed using a machine learning method, for example, to determine what portion of speech may correspond to a name.

Identification data 22 may also include geographic location of one or more of the devices participating in the communication session. Geographic identification may be derived from an Internet Protocol address, caller ID, Wi-Fi signatures, a Global Navigation Satellite System (GNSS) such as Global Positioning System (GPS), proximity detection by another computer device of known location, or by other sources of location information.

For example, many or complex audio signals are generated during a portion of a conversation. Additional information, such as age or sex, may be used to improve the recognition of a particular speaking participant. A following dialog may provide an example:

Bob: Is Alice here?
[long pause]
1-800-1234-123: *cough*

In this example, the long pause provides temporal information that may be used in addition to the transcription to determine the identity of the one or more users for each communication device. The participant calling from 1-800-1234-123 might not be Alice even though the participant spoke after Bob). Then based on those signals, and "names" detected in the transcription or directly in the audio stream, the names are assigned to unidentified participants. These techniques may be applied throughout the dialog on an ongoing basis. The use of this or similar techniques may be based on a changing strength the system has in the accuracy of the mapping of names to communication devices. Temporal information may also be derived according to when the participant joined the meeting. For example, participants may be identified by number according to when they joined (e.g., participants are numbered in chronological order of when they joined the communication session).

In another example, an identifier for a participant may be based on who invited the participant. For example, "user invited by Bob" may be an identifier for a participant who was invited to the communication session by the participant identified as Bob. In yet another example, participants may be identified by a feature or coordinate of a virtual environment of the communication session.

In another example, an identifier for a participant may be based on a position of an avatar for the participant in a virtual environment of the communication session. For example, if the communication session includes a visual representation of a virtual environment, participants may be identified based on their position or situation within the virtual environment. Consider an example where a communication session includes a virtual environment representing a campground with avatars of participants positioned within the campground. In this example, participants could be identified by where they are located within the virtual scene, such as, for example, "by pile of wood," "under tree," or "close to tent," etc.

In other examples, some participants receive an anonymous identification. This may be in order to maintain confidentiality of information. For example, a network identifier, such as a hashed network ID, can be transformed by an algorithm into another identifier. The algorithm may include, for example, a cryptographic hash function, use of a secret cookie, ash-based message authentication code (HMAC), or a selection of a pseudo-random number.

Communication device 20-1 includes a conference application 8 that, when executed, provides functionality to communication device 20-1 to establish and maintain communications between one or more communication devices 20-2 through 20-6. Conference application 8 may also provide signals to display device 4 to display information related to the video conference communications and to enable user 14 to interact with conference application 8. For example, conference application 8 may provide identification data, such as identification data 22, to display device 4. Display device 4 may display some or all of identification data 22 in participant information 18.

Conference application 8 may include a name recognition module 6 and a transcription module 10. In some examples, name recognition module 6 and a transcription module 10 may be combined into a single module. Name recognition module 6, in various instances, provides communication device 20-1 with capabilities to detect names of participants that are spoken by one or more participants or otherwise provided, such as in a text-based chat conversation. A spoken name may be one or more sounds represented in an audio signal. A spoken name may be spoken by a participant or output by a communication device.

Once name recognition module 6 detects a spoken name in an audio sample, such as a voice sample, name recognition module 6 provides the audio sample to transcription module 10. Transcription module 10 transcribes the spoken name into a character string. For example, transcription module 10 may perform speech recognition on one or more audio signals to obtain speech-recognized text based on speech in the one or more audio signals. The character string may be an alphanumeric string, which may correspond to a name or identity of the participant or communication device. If name recognition module 6 detects a written name of a participant, the name is already in textual form and is not provided to transcription module 10. In other examples, conference application 8 contains further communication modules having additional capabilities.

The name, in the textual form, may be provided to communication devices 20-2 through 20-6 in signal form. The signal may be formatted such that its recipient may utilize the signal. In some examples, one or more signals representing a name may not be provided to devices that cannot output the name. For example, audio communication devices may not receive the signal comprising visual representative information (for example, text) because the audio communication devices may not be capable of outputting that visual information.

Likewise, one or more of the communication devices 20-2 through 20-6 sends image data 38 and audio data 36 from similar input devices to communication device 20-1. During a video conference, communication device 20-1 may output some or all of this received image data 38 and audio data 36, for example, with output devices 54 (for example, a speaker) and display device 4. In further examples, audio data 36 may not be streamed while image data 38 is streamed. In another example, multiple audio data signals may be streamed by communication device 20-1.

Display device 4 of communication device 20-1 may display all or part of image data 38. Conference application 8 may define a number of image data signals that may be displayed on display device 4 at any given moment during the video conference. For example, as shown in FIG. 1, display device 4 may be configured to display image data associated with all six of the communication devices.

Display device 4 further displays participant information 18. Participant information 18 may include information about the participants and communication devices 20 who are engaged in the communication session. For example, participant information may include identifying information of the participant and communication device (such as a name, a phone number, or Internet Protocol (IP) address associated with the participant's device), an indication of whether a participant is currently actively participating (such as speaking, showing a document, etc.), statistical information for the participants (such as when a participant joined the video conference, how long the participant has been in the video conference, how long the participant has been actively participating, etc.), approximate geographical location of communication devices 20, capabilities of communication devices 20, and any other information related to participants or communication devices 20 in a communication session. In one example, participant information 18 may include a list of participants and their names or other identifying information. Identifying information of the participants may be updated with character strings of names, based on names detected by name recognition module 6, which may have been transcribed by transcription module 10.

Therefore, in the example of FIG. 1, name recognition module 6 may detect names of participants in a communication session. The names may be, for example, audio-based or text-based. When a detected name is audio-based, such as spoken with a voice of a participant, transcription module 10 may transcribe the name using speech recognition. The name may be displayed in participation information 18, which may include a list of names of the participants. Non-name identifiers included in participation information 18, such as phone numbers or IP addresses, may be replaced with text of the detected names. One or more signals representative of the name may be provided to other communication devices 20 to output (for example, display) the name.

Figure 2:
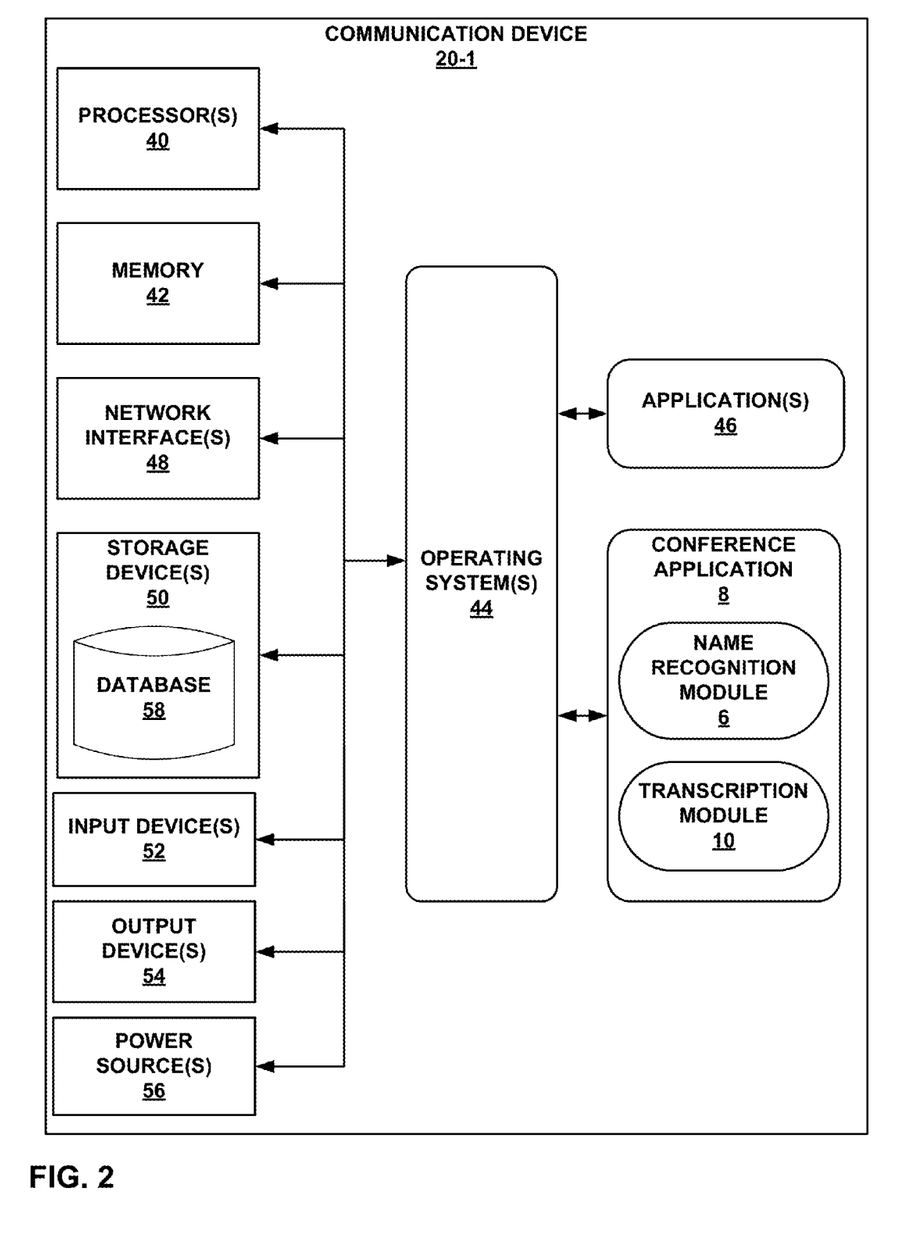
FIG. 2 is a block diagram illustrating further details of one example of the communication device shown in FIG. 1, in accordance with one or more aspects of the present disclosure.

FIG. 2 is a block diagram illustrating further details of one example of communication device 20-1 shown in FIG. 1. FIG. 2 illustrates only one particular example of communication device 20-1, and many other example embodiments of communication device 20-1 may be used in other instances. Additionally, one or more communication devices 20-2 through 20-6 may be similar to communication device 20-1 as shown in FIG. 2. In other examples, communication device 20-1 may be a server device. In some examples, the communication device of FIG. 2 may be a server device.

As shown in the specific example of FIG. 2, communication device 20-1 includes one or more processors 40, memory 42, one or more network interfaces 48, one or more storage devices 50, one or more input devices 52, one or more output devices 54, and one or more power sources 56. Communication device 20-1 also includes one or more operating systems 44. Communication device 20-1 may include one or more applications 46 and conference application 8. Conference application 8 may include name recognition module 6 and transcription module 10, which may be executable by communication device 20-1. One or more operating systems 44 may include conference application 8 or selection module 6 and transcription module 10 executable by communication device 2. Operating system 44, applications 46 and conference application 8 are also executable by communication device 20-1. Each of components 40, 42, 44, 46, 48, 50, 52, 54, 56, 6, 8, and 10 may be interconnected (physically, communicatively, and/or operatively) for inter-component communications.

Processors 40 may be configured to implement functionality and/or process instructions for execution in communication device 20-1. Processors 40 may be capable of processing instructions stored in memory 42 or instructions stored on storage device(s) 50. One or more processors 40 may be configured to execute conference application 8, including selection module 6 and transcription module 10.

Memory 42 may be configured to store information within communication device 20-1 during operation. Memory 42 may, in some examples, be described as tangible or a non-transitory computer-readable storage medium. In some examples, memory 42 is a temporary memory. Memory 42 may also, in some examples, be described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 may be used to store program instructions for execution by processor(s) 40. Memory 42 may be used by software or applications running on communication device 20-1 (for example, one or more of applications 46) to temporarily store information during program execution.

One or more storage devices 50 may also include one or more tangible or non-transitory computer-readable storage media. Storage devices 50 may be configured to store large amounts of information. Storage devices 50 may further be configured for long-term storage of information. In some examples, storage devices 50 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Storage device(s) 50 may store database 58. Database 58 may contain information associated with at least one of the participants or communication devices that are or have engaged in a communication session. For example, database 58 may store names of participants, as well as information identifying devices the participants used to connect to the communication session. For example, database 58 may store identifiers such as IP addresses, radio frequency, or phone numbers. One or more names associated with the identifiers may be stored in database 58. In some examples, database 58 stores voice samples of participants. Database 58 may also contain a list of potential names of participants.

Database 58 may contain information about participants from previous communication sessions as well as a current communication session. In some examples, database 58 may only store participant information after communication device 20-1 has received permission from the participant to store the information. In some examples, database 58 may be stored remotely, not locally on communication device 20-1.

Communication device 20-1 may also include one or more network interfaces 48. Communication device 20-1 may utilize one or more network interfaces 48 to communicate with external devices via one or more networks (for example, network 32 shown in FIG. 1). In one example, one or more network interfaces 48 may correspond to an interface for receiving data from communication devices (for example, communication devices 20-2 through 20-5 of FIG. 1). In some examples, communication device 20-1 may include a plurality of either or both input and output interfaces. In some examples, network interfaces 48 may include separate input and output network interfaces of network interfaces 48. In other examples, input and output interfaces may be may be functionally integrated.

One or more network interfaces 48 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 48 may be an optical transceiver, a radio frequency transceiver, or any other type of device that can send and receive information. Examples of such network interfaces may include Bluetooth®, 3G and WiFi® radios in mobile communication devices as well as a Universal Serial Bus (USB). Examples of such wireless networks may include WiFi®, Bluetooth®, and 3G. In some examples, communication device 20-1 may utilize network interface(s) 48 to wirelessly communicate with an external device, such as server 30 or communication devices 20-2 through 20-6, such as a mobile phone, or other networked communication device.

Communication device 20-1 may also include one or more input devices 52. Input devices 52 may be configured to receive input, for example, from user 14, through tactile, audio, or video feedback. Examples of input devices 52 may include a touch-sensitive display, a mouse, a keyboard, a voice responsive system, a microphone, video camera 16, or any other type of device for detecting a command from user 14. In one example, one or more input devices 52 may comprise input/output device 12 as shown in FIG. 1. In another example, one or more input devices 52 may comprise display device 4 as shown in FIG. 1.

One or more output devices 54 may also be included in communication device 20-1, for example, display device 4 as shown in FIG. 1. Output devices 54 may be configured to provide output to user 14 using tactile, audio, or video output. Output devices 54 may include a touch-sensitive display, and may utilize a sound card, a video graphics adapter card, or any other type of device for converting a signal into an appropriate form understandable to humans or machines. Additional examples of output devices 54 may include a speaker, a cathode ray tube (CRT) monitor, a liquid crystal display (LCD), or any other type of device that can provide output to user 14. In one example, one or more output devices 54 may comprise input/output device 12 as shown in FIG. 1.

Communication device 20-1 may include one or more power sources 56, which may provide power to communication device 2. The one or more power sources 56 may be one or more batteries, which may be rechargeable. The one or more batteries may be made from nickel-cadmium, lithium-ion, or any other suitable material. In other examples, communication device 6-1 may be connected to an electrical grid through power source(s) 52, for example, via a power outlet or telephone line.

Communication device 20-1 may implement one or more operating systems 44. One or more operating system 44 may control the operation of components of communication device 2. For example, operating systems 44 may facilitate the interaction of application 46 or conference application 8 with processor(s) 40, memory 42, network interface(s) 48, storage device(s) 50, input device(s) 52, output device(s) 54, and one or more batteries 56. Any software or hardware modules implemented within or executed by communication device 20-1 may be implemented or contained within, operable by, executed by, or be operatively or communicatively coupled to components of communication device 20-1. For example, operating system 44, applications 46, and conference application 8 may be coupled as described above to one or more of processors 40, memory 42, network interface(s) 44, storage device(s) 46, input device(s) 48, and output device(s) 50.

Conference application 8 may provide functionality to communication device 20-1 to engage in a communication session. The communication session may be a video conference, a text-based chat, which may include a virtual hangout. Conference application 8 may be used to initiate a communication session or join an existing communication session. In other examples, conference application 8 invites participants, schedules communication sessions, hosts communication sessions, and may provide any other functionality used for communication device 20-1 to engage in a communication session. For example, conference application 8 may dial a phone number of another participant in order to invite the participant to join a communication session.

Conference application 8 may additionally include name recognition module 6 and transcription module 10, which may be executed as part of operating system 44. In other cases, name recognition module 6 and transcription module 10 may be implemented or executed by communication device 20-1. Name recognition module 6 may detect the presence of a name in information exchanged during a communication session. Transcription module 10 may transcribe an audio sample into a word, name, or other character string. The audio sample may be a voice sample from speech of a participant, an audio sample from a machine text-to-speech functionality, or the like. Additionally, name recognition module 6 and transcription module 10 may receive input from a component such as processors 40, memory 42, one or more network interfaces 48, one or more storage devices 50, one or more output devices 54, one or more batteries 56, or operating system 44. Furthermore, name recognition module 6 may perform additional processing on at least one of communication data 34 and identification data 22. The additional processing may include searching the data in order to detect an audio- or text-based name and extracting a portion of the data including a detected name. In other cases, name recognition module 6 may transmit input to an application, for example, applications 46 or other component in communication device 20-1.

Figure 3A:
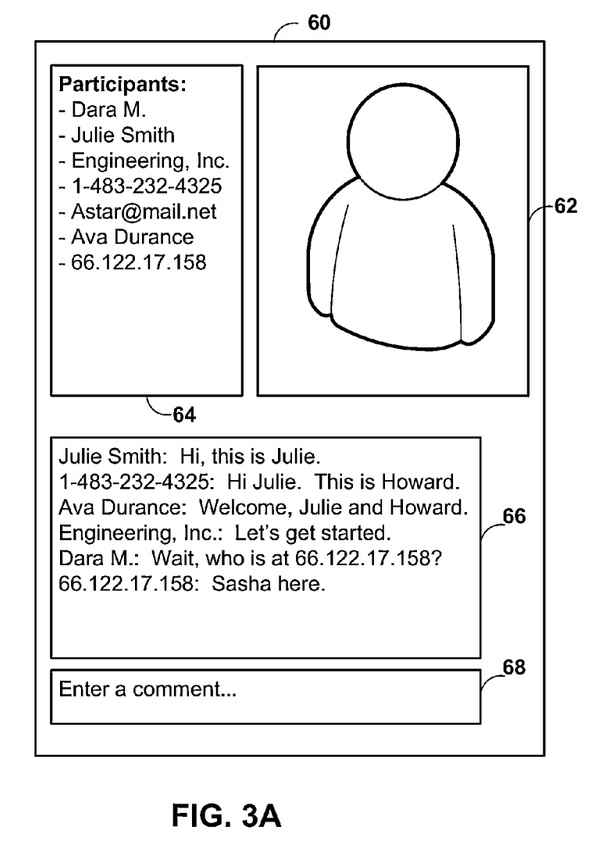
FIGS. 3A and 3B are block diagrams illustrating examples of graphical user interfaces (GUIs) of a communication device engaged in a communication session and configured to update identifiers of participants based on name recognition, in accordance with one or more aspects of the present disclosure.
Figure 3B:
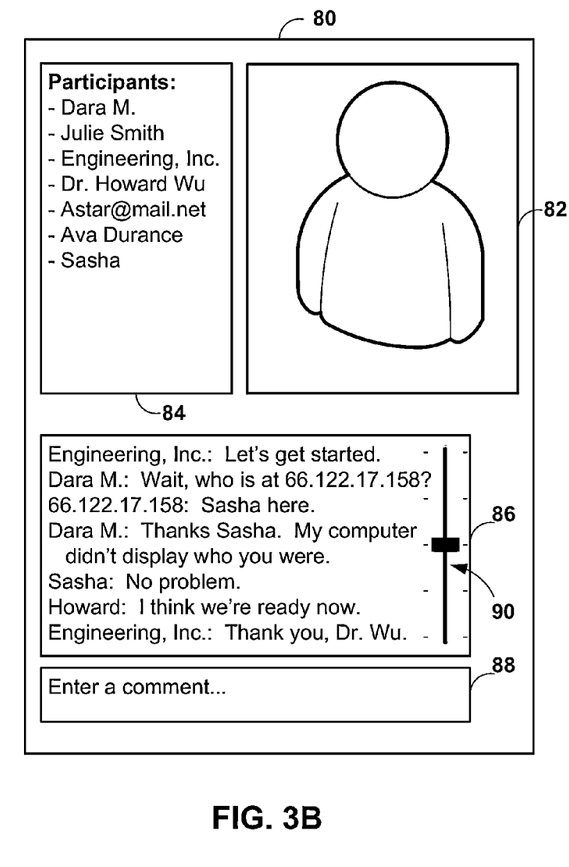

FIGS. 3A and 3B are block diagrams illustrating graphical user interfaces (GUIs) 60 and 80 of a communication device engaging in a communication session and configured to update identifiers of participants based on name recognition, in accordance with one or more aspects of the present disclosure. FIGS. 3A and 3B illustrate particular example GUIs 60 and 80 of a communication device, such as communication device 20-1 of FIGS. 1 and 2. Many other example GUIs may be used in other instances. Additionally, GUIs 60 and 80 may be displayed by communication devices 20-2 through 20-6 as shown in FIG. 1.

In these particular use-case examples, FIG. 3A represents a GUI of a communication device, such as communication device 20-1, engaged in a communication session with seven other participants. FIG. 3A corresponds to a first time during the communication session. FIG. 3B represents the GUI of communication device 20-1, engaged in the same communication session with the seven other participants as in FIG. 3A. However, FIG. 3B corresponds to the communication session at a second time, later than the first time. In other examples, other numbers of participants may be engaged in the communication session.

A display device, such as display device 4 of FIG. 1, which may be a touch-screen, may output a graphical user interface, which may be virtually partitioned into different sections. In FIG. 3A, GUI 60 includes a video section 62, a participant information section 64, a dialog section 66, and a comment field 68. The sections 62, 64, 66, and field 68 may be individual virtual sections that comprise an image having any shape, size, coloration, or style. In other examples, GUI 60 may display one or more of the sections as an overlay. An overlay may be an image having any shape, size, coloration, or style that is overlaid on top of at least a portion of other data, such as image data 62.

Video section 62 may display video or other image data, such as image data 38, of one or more participants in the communication session. For example, video section 62 may display video from fifth communication device 20-5, video from the device of a current speaker during the communication session, or the like. For devices which do not output image data, video section 62 may display a stored image or video sample associated with the device or a user of the device or not display any image or video for that user.

Participant information section 64 may display participant information, which may include information about the participants and communication devices 20 that the participant use to engaged in the communication session. As shown in FIG. 3A, participant information section 64 includes a list of participants in the communication session. Participant information section 64 may also include additional information, such as a status of the participant (for example, active, passive, away, or the like), an indicator of which participants are currently speaking, statistical information about the participants, or any other information. Information that may additionally be provided in participant information 64 include a thumbnail showing image data outputted by communication device 20-1 (such as, for example, a video feed from camera 16), or provide interactive options available to a user during a communication session. Such options may include, for example, functionality to close the application, adjust brightness, adjust volume, or the like. Any of the techniques and features described herein may be user configurable in some examples.

If a name of a participant is available, the name may be displayed in participant information section 64. A name of a participant may be available because, for example, the name is provided by the participant's communication device, determined from a calendar schedule notice, or extracted from voice or text chat. In the example of FIG. 3A, seven participants are listed. Four of them are identified by name, including Dara M., Julie Smith, Engineering, Inc., and Ava Durance. Participants may be identified, for example, by their personal name, a name of an organization, a device name, or any other type of name.

If a name is not available for a particular participant, other identifying information may be displayed. For example, participant information section 64 may display an identifier of at least one of the participant or communication device. The identifier may be, for example, an IP address associated with the communication device, a telephone number of the communication device, an email address, or other identifying information. In the example of FIG. 3A, three of the seven participants are not named. Instead, they are identified by other identifying information, including a phone number (for example, 1-483-232-4325), an email address (for example, address@example.net), and an IP address (for example, 66.122.17.158). In other examples, other identifying information may be provided in participant information section 64. In another example, participants may be identified as "User 1," "User 2," etc.

Dialog section 66 may organize and display some information exchanged during the communication session, such as transcribed audio (for example, speech) and text-based chat. A transcription service, such as that provided by transcription module 10, may transcribe the speech of the participants. That is, transcription module 10 converts audio to text, based on speech recognition. The audio may include speech in an audio feed, such as audio data 36. In some examples, transcription module 10 transcribes most or all of the words spoken by the participants during a communication session. In other examples, transcription module 10 may only transcribe speech that has been identified by name recognition module 6 as potentially containing a name of a participant. Dialog section 66 may output all transcribed speech and text-based chat. In other examples, dialog section 66 may display text-based chat.

Comment field 68 may be a field for a user of the communication device, such as user 14, to input text. For example, user 14 may enter text into comment field 68 in order to communicate via text-based chat with one or more of the participants of the communication session. In some examples, some communication devices connected to the communication session, such as a telephone or a cell phone, may not support text-based chat. A GUI similar to GUI 60 may not be provided for such communication devices.

As shown in FIG. 3A, dialog section 66 displays history of speech and text-based chat during a communication session. In one example, dialog section 66 may display speech and text-based chat up until a first point in time during the communication session. Dialog section 66 displays one example dialog for illustrative purposes, but it is to be understood that any type of dialog, text-based, audio, or otherwise, may be included in dialog section 66 and that there are countless other examples. For example, Julie Smith said "Hi, this is Julie." Julie may have spoken this upon entry into the communication session. Transcription module 10 has transcribed Julie Smith's speech into a character string and provided it to GUI 60.

Next, a user identified by a phone number, 1-483-232-4325, said "Hi Julie. This is Howard." This speech may also be transcribed by transcription module 10. Ava Durance, possibly using a device that does not support audio or because Ava Durance is in a place where speaking is undesirable, typed in "Welcome, Julie and Howard." Another participant, identified as Engineering, Inc., said "Let's get started." Another participant, Dara M., wondered who are the other participants in the communication session and said "Wait, who is at 1-483-232-4325?" At this question, the participant who is connected with a device having a telephone number of 1-483-232-4325 provided a more specific identity by saying "Sasha here."

In some examples, the participant does not have to speak their own name, but their identities may be inferred based on the dialog, voice types, sex of voice, age, or other characteristics or information. In some examples, the sex of the voice may be determined by pitch. If children were known to be present, the determination of sex using pitch may be adjusted. Techniques described herein can be applied on a continual basis, that is, the assignments of identities may be re-evaluated throughout the communication session. In another example, the assignments may be probabilistic. In some examples, part or the whole dialog and some patterns discovered in the dialog may be taken into account.

FIG. 3B depicts an example graphical user interface 80 of communication device 20-1 engaging in the communication session of FIG. 3A at a second instance, later than FIG. 3A. Similar to GUI 60 of FIG. 3A, GUI 80 of FIG. 3B includes a video section 82, a participant information section 84, a dialog section 86, and a comment field 88. Video section 82, participant information section 84, dialog section 86, and comment field 88 may have similar functionality to video section 62, participant information section 64, dialog section 66, and comment field 68 described above.

In FIG. 3B, participant Dara M. responded to Sasha and said "Thanks Sasha. My computer didn't display who you were." Sasha replied "No problem." Next, Howard tried to move the meeting along and said "I think we're ready now." The one or more participants associated with Engineering, Inc. stated "Thank you, Dr. Wu." Dialog section 86 displays these additional communications, which may have been from transcribed speech or text-based chat input. In the example shown in FIG. 3B, dialog section 86 displays lines of newer transcribed speech and text-based chat and may not display some older lines in order to display the newer lines. Dialog section 86 may display a scroll-bar 90 that may be used to scroll through the lines.

As shown in FIG. 3B, participant information section 84 has been updated to further identify participants in the communication session. In comparison to FIG. 3A, FIG. 3B provides names for some participants who were previously not identified in FIG. 3A with names. For example, an application, such as conference application 8, may have detected and extracted the names from speech or text-based chat and provided the names for display in participant information section 84. For example, name recognition module 6 may have detected names spoken in audio speech or typed in text-based chat. Transcription module 10 may have transcribed the detected names if they were in audio form. Conference application 8 may provide signals related to the detected names to a display device, such as display device 4, for output on GUI 80.

In the examples of FIG. 3B, name recognition module 6 may have detected names for participants previously identified in FIG. 3A as 1-483-232-4325 and 66.122.17.158. Transcription module 10 may have transcribed the detected names in a voice sample, and transcribed the speech into a character string. A signal representing the character string is provided to GUI 80 in order to display updated names of the participants.

Name recognition module 6 may monitor audio signals, including speech, or text-based chat in order to detect a possible name. In one example, name recognition module 6 detects a group of sounds or a voice sample and compares it to one or more patterns of sounds, which may be stored in a memory. The one or more patterns of sounds may be sounds or words having a defined format, where a name is included in the pattern. The pattern may contain a name placeholder in an approximate position, which may be a temporal position. As used herein, a name placeholder may be a sound or a set of sounds in a pattern that is associated with a name. The name placeholder may be located in a particular position of the pattern. For example, the name placeholder may come in the beginning, end, or somewhere in the middle of a pattern. The placeholder may be in a temporal position (for example, at a particular time of a spoken phrase or sentence). In a text-based example, the placeholder may be in a particular position of a written phrase or sentence.

For example, when a participant previously identified as 1-483-232-4325 says "This is Howard," name recognition module 6 may detect "this is Howard" as matching a pattern of sounds indicating a name follows the words "this is." The phrase "this is X" may be stored in a memory, such as in database 58 of storage device 50 of FIG. 2, as a pattern. X may indicate a name placeholder, that is, the position in the phrase or sentence where a name would be. Thus, name recognition module 6 determines that the sound corresponding to "Howard" is a name of the participant at 1-483-232-4325, because "Howard" occurs at the name placeholder. Once identified as a name, transcription module 10 may transcribe the sound corresponding to "Howard" in the voice sample into a character string. A signal comprising information of the character string may be provided to display device 4 in order to output an updated name for 1-483-232-4325, that is, Howard.

Identifying information of the participants may be updated with character strings of names. These names may have been based on names detected by name recognition module 6 and may have been transcribed by transcription module 10. In another example, transcription module 10 transcribes voice samples in order that name recognition module 6 may compare a textual version of the voice sample to a textual version of the one or more patterns of sounds. For example, the at least one character string may be compared to character strings of names included in the database. The at least one character string may be adjusted based at least in part on the comparison of the at least one character string to the character strings of names. For example, if a character string transcribed from a detected spoken name is "Bem" and a database contains a character string "Ben" associated with an identifier of the communication device, the transcribed character string may be adjusted to be "Ben." That is, the adjustments may be spelling corrections, for example.

Furthermore, names may be assigned to participants based on an order of who is speaking and has spoken. For example, if a first participant responds to another, second participant, and the first participant uses a phrase associated with speaking a name of a person who is being responded to, name recognition module 6 may determine that the name spoken by the first participant is a name of the second participant.

In some examples, each recognized name may be updated as further information is gathered, and more instances of detected names are recognized. For example, a weight may be assigned to each recognized name based on how likely the transcribed name is to be correct. For example, after the participant at 1-483-232-4325 said "This is Howard," Ava Durance typed "Welcome, Julie and Howard." Name recognition module 6 may compare "Welcome, Julie and Howard" to a database of patterns of phrases that include names. Name recognition module 6 may determine that sounds coming after a "welcome" may be one or more names because the sounds are in a name placeholder. Thus, name recognition module 6 may determine that the sound "Howard" may be a name. Name recognition module 6 may compare this new detected instance of Howard to the previous detected name, and if there is an approximate match, the weight given to the previous detected name is increased. In contrast, if there is not an approximate match, the weight given to the previous detected name may be decreased. Also, as additional names are detected for a particular participant, these names may be used to update or correct the outputted name. An additional instance of the detected name may be used to correct a determination of the name from a previous instance.

Also as shown in FIG. 3B, Dara M. asked "who is at 66.122.17.158?" The participant indentified by 66.122.17.158 responded "Sasha here." Name recognition module 6 may determine that "Sasha here" corresponds to a phrase including a name at a name placeholder, and extracts the name "Sasha" with the transcription of transcription module 10. Participant information 84 includes an updated name for the participant previously identified as 66.122.17.158, that is, Sasha.

Name recognition module 6 may also include at least one rule or pattern relating to name formats. These rules or patterns may enable name recognition module 6 to place names in a specific order, such as a title (for example, Dr., Ms., or Mr.), a first name (such as Howard or Julie), one or more middle names, and a last name (such as Wu or Smith). In other examples, name recognition module 6 may place names in other orders. Therefore, when the participant identified as Engineering, Inc. said "Thank you, Dr. Wu," in response to Howard, name recognition module 6 may determine that Dr. Wu is the same participant as Howard. This determination may be made based on speaking order of the participants. Therefore, applying the names to a name format, name recognition module 6 may determine that a more complete identification of Howard may be Dr. Howard Wu. This updated character string may be displayed in participant information 84.

In other examples, other methods of detecting names, correcting the names, and converting them to text are contemplated. In some examples, signals representing the detected names are provided to other communication devices in the communication session, wherein the signals are formatted to be readable by each communication device. In some examples, only communication devices that may output participant information receives a signal containing the participant information. In yet other examples, each capable communication device comprises a name recognition module 6 in order to locally determine identification information for the participants.

Figure 4:
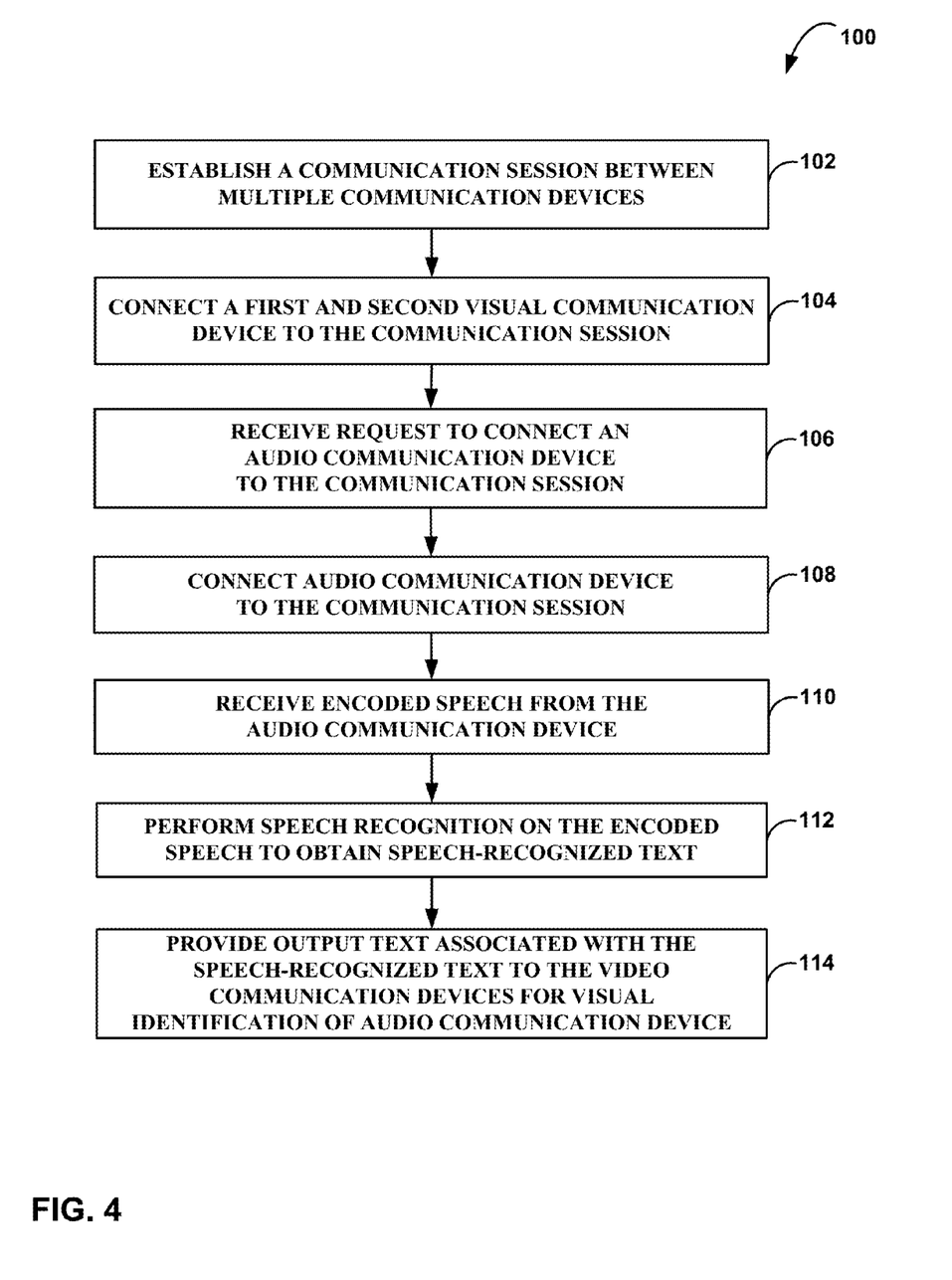
FIG. 4 is a flow chart illustrating an example method that may be performed by a communication device to determine a name for a participant in a communication session, in accordance with one or more aspects of the present disclosure.

FIG. 4 is a flow chart illustrating an example method 100 that may be performed by a communication device to determine a name for a participant in a communication session, in accordance with one or more aspects of the present disclosure. A communication session may be a real-time video conference or other communication session. Some audio-only participants may be engaged in the communication session. Method 100 may be performed by some of communication devices 20 as shown in FIG. 1 or 2, such as communication device 20-1.

Method 100 may include establishing, by communication device 20-1, a communication session between multiple communication devices (102). In some examples, a server, such as server 30, establishes the communication session to a cloud network. The communication devices may be video and audio communication devices, such as communication devices 20-2 through 20-6. First and second visual communication devices are connected to the communication session (104).

Method 100 includes receiving a request to connect an audio communication device to the communication session (106). In some examples, the request may be in response to the computer device, such as a server, dialing an audio communication device, such as a telephone. In other examples, the request may be from the audio communication device calling into the communication session.

Method 100 further comprises connecting the audio communication device to the communication session (108). For example, a participant may be connected to the communication session using a telephone 20-2. The participant may have dialed into the communication session using the telephone or may have received a call from one of the other communication devices in the communication session or a server hosting the communication session. In other examples, the audio communication device may be identified by a device name, an IP address, an email, or the like.

Method 100 comprises receiving encoded speech from the audio communication device (110). The encoded speech may include speech of a participant using the audio communication device in the communication session. The encoded speech may include a name or other identifier associated with one or more participants. In other examples, the encoded speech may include speech of a participant other than the participant using the audio communication device in the communication session.

Once the encoded speech is received, method 100 may include performing speech recognition on the encoded speech to obtain speech-recognized text (112). The speech-recognized text may be modified based on additional information, such as corrections, to create output text associated with the speech-recognized text. In some cases, the output text is the same as the speech-recognized text. The output text may be provided to the video communication devices for visual identification of the audio communication device (114).

In some examples, method 100 may comprise detecting a spoken name associated with the first device. The spoken name may be any speech from a participant or from a machine. In another example, method 100 further includes detecting a text-based name of a participant from textual information such as a text chat. In one example, detecting the spoken name further comprises detecting a group of sounds spoken during the communication. The detected group of sounds may be compared to one or more patterns of sounds stored in a memory, wherein each pattern is associated with a phrase that comprises a name placeholder in a position of the phrase. For example, patterns may include phrases such as "my name is X," "hello X," "this is X," "thank you, X," "X, nice to meet you," "what do you think, X," and the like. X indicates the name placeholder and may be in a position of a sound or set of sounds corresponding to a name in the pattern or phrase. Name recognition module 6 may select one of the patterns that approximately matches, or most closely matches, the group of sounds. Then, name recognition module 6 extracts those sounds from the group of sounds that are in approximately the same position as the name placeholder.

In yet another example, detecting the spoken name may further include determining which device of the plurality of devices the spoken name is associated with based on an identity of a speaker who provided the spoken name. For example, if the spoken name was spoken by a first participant in response to a second participant's request that included a name, name recognition module 6 may determine that the spoken name corresponds to the first participant. In another example, the order of participants speaking may be used to determine which device the spoken name is associated with.

In some examples, a detected spoken name is compared to a names database. The names database may include a listing of known names. If a detected spoken name approximately matches one or more names in the names database, it may be more likely that a name was correctly detected. In another example, the names database may contain information relating to communication devices used to connect to the communication session. For example, the names database may contain an entry corresponding to an identifier, such as a telephone number. One or more names may be stored in the database associated with the telephone number. The one or more names may have been determined from previous communication sessions, from a phone number listing of who the phone is registered to, or from other means of determining names. The detected spoken name may be compared with one or more names associated with the identifier. When the detected spoken name matches one of the one or more names within a threshold level, the detected spoken name may be confirmed as a name of the participant. The threshold level may be based on matching sounds, letters in the spelling of the name, a voice sample, or other means of comparison.

In another example, detecting the spoken name further comprises querying the names database to determine when a name is associated with a phone number or other identifier of the first device. If the database contains a listing of the identifier of the first device, name recognition module 6 may determine whether a name is associated with the identifier. For example, when there is a name associated with a phone number of the first device, name recognition module 6 may use that name as an identifier for the first device. If there is more than one name associated with the phone number, name recognition module 6 may select from the names based on other factors. For example, if there are any voice samples for the names stored in the database, name recognition module 6 may compare a voice sample of the user of the first device with the stored voice samples, and select the name corresponding to the stored voice sample that most closely matches. The comparison may, for example, be based on pitch, tone, and amplitude.

In another example, method 100 includes signaling the first device to prompt a user of the first device to provide a name. For example, the communication device may establish a communication session and request a participant to join by dialing a phone number for the first device of the participant. When the participant answers the first device and joins the communication session, the participant may be prompted to state her or his name. Name recognition module 6 may determine what the participant states is a name for the participant.

Once a spoken name is detected, method 100 further includes transforming the detected spoken name into at least one character string (106). In one example, transforming the detected spoken name includes transcribing the detected spoken name into the at least one character string. For example, transcriber module 10 transcribes a voice sample detected by name recognition module 6 to correspond to a name. For example, name recognition module 6 may extract a particular sound or set of sounds from a voice sample that corresponds to a name. The at least one character string may be a transcription of that extracted sound or set of sounds.

In another example, when a name is detected for a dialed-in audio communication device, the participant of the dialed-in audio communication device is requested to confirm the name. While the participant is queried, any audio in the meeting may be buffered. Once the participant has confirmed the name is correct, the buffered audio may be played back to the participant in order that the participant does not miss any of the speech due to the query. In some examples, the audio in the meeting may be adjusted to save time, for example, by removing pauses or speeding up the conversation so that no speech is lost by inserting an audio request to the participant. These techniques may be applied in any example where data is generated and outputted by the system, to a particular participant, or to all participants in the system.

In one example, transforming the detected spoken name into the at least one character string may be based at least in part on the comparison of the detected spoken name to the names included in the names database. For example, at least one character string of the voice sample may be compared to a name associated with the phone number of the first device. The at least one character string may be adjusted or corrected based on the comparison of the at least one character string to the one or more character strings of the name associated with the phone number.

Transforming the detected spoken name into the at least one character string may further include transforming a first instance of the spoken name into the at least one character string, detecting a second instance of the spoken name, transcribing the second instance, and altering the at least one character string based on the second instance of the spoken name.

When the encoded speech is recognized and text is generated from it, method 100 may further include sending, by the communication device, a representation of the at least one character string to at least a second device of the plurality of devices for output by the second device. One or more signals representing the at least one character string may be sent to other communication devices in the communication session for output by those communication devices. In some examples, the second device outputs the at least one character string via a display device. In other examples, the second device outputs the at least one character string using a machine-based speech functionality. An identifier associated with a network connection of the first device may be replaced with the at least one character string to identify the first device. For example, a display device that previously displayed the identifier to identify the first device may now display the at least one character string to identify the first device.

If a correction to the at least one character string is received by the communication device, an updated at least one character string based on the correction may be sent to at least the second device for display by the second device. In one example, one or more participants may be provided with an option to make corrections to a participant's name. A correction may be from another participant correcting a name, correcting a name based on further detected instances of the name, or the like.

In another example, method 100 further includes sending, by the communication device, one or more signals comprising an audio representation of the at least one character string to the first device. That is, the first device, such as a telephone, receives one or more audio signals that may indicate the participant's detected and transcribed name. The participant may be prompted to indicate whether the name is correct. For example, the participant may be requested to press "1" on a touchpad of the telephone if the name is correct and a "2" if the name is incorrect. If the at least one character string is approximately correct, such as when the audio representation of the at least one character string approximately matches the spoken name from the first device, the participant may indicate the name is correct and a confirmation is sent to the communication device. If the participant indicates the name is incorrect, the at least one character string may not be provided to the communication devices in the communication session.

Method 100 may further include calling, by the communication device, a phone number associated with the at least one device in order to connect the at least one device to the communication session through a telephone service.

In another example of method 100, a participant of the communication session using the first device may be prompted to provide permission to store a voice sample associated with the spoken name in a memory of the communication device. When the participant provides permission, at least one character string may be stored in the memory associated with a telephone number of the first device. When the participant denies permission, the at least one character string is not stored, and may be deleted upon ending the communication session.

Voice samples from the communication session may be stored in a database for future communication sessions. For example, a storage device of the communication device may store a first voice sample of a participant speaking into the first device connected to the first communication session. The first device may be associated with a telephone number. When a second communication session is initiated, a second voice sample may be taken from the first device during the second communication session. The second voice sample may be compared with the first voice sample. When the voice samples match within a selected threshold level, at least one character string from the first voice sample, which may be stored in a database with the first voice sample, may be forwarded to at least a third device connected to the second communication session. The selected threshold level may relate to pitch, tone, and amplitude of the voice samples, in order to determine if a speaker of the second voice sample is the same as the first voice sample.

In another example, the names database may be queried to determine which names are associated with the telephone number. When there are two or more names associated with the telephone number, selecting one of the names may be based on a comparison between the voice sample with one or more stored voice samples associated with the two or more names.

In examples where the communication session is peer-to-peer, two or more of communication devices 20 implement a protocol to agree on the best name for a participant. In one example, the protocol is a consensus protocol. In that case, multiple communication devices 20 in the communication session can detect the spoken name. The format of the spoken name may be voted on by communication devices 20. In some examples, an earlier sample is compared. In a peer-to-peer setting, some of the participants may have various amounts of pre-stored audio samples, so a voting mechanism may assign different weights to different participants.

In some examples, when a first participant speaks a name of a second participant, method 100 includes determining which device the first participant is using to identify who provided the spoken name input. Method 100 may also include the communication device 20 utilizing other information to determine the identity of a participant, including a flow of the conversation, which participant speaks next, and the like. In some examples, communication device 20 calculates a metric indicating how strongly the participant's name is considered to be known. In such an example, whenever a new name is detected, method 100 may include assigning the name to the participant with the weakest evidence their name being properly assigned.

Furthermore, communication device 20 may consider the probability that merging a name leads to a probable name. For example, "Dr Ming", and "Cho" may be a probable name of "Dr Cho Ming." In another example, method 100 determines which participant answers a typical query pattern such as "Are you there <name>?" The participant who answers the query may be assigned the value in <name>. Another example includes if participants A and B are chatting, and B is not identified, then participant C suddenly speaks and is not identified, and A asks for a name by saying "Who spoke?," then it is less likely that A asks for the name of B. In that case, any name detected in response would most likely be assigned to participant C.

In other examples, session initiation protocol (SIP) endpoints may be used as identifiers. SIP endpoints may be formatted similar to email addresses. In other examples, uniform resource identifiers (URI) may be used to identify endpoints in Extensible Messaging and Presence Protocol (XMPP), which can be used as identifiers.

Techniques of the present disclosure may provide an improved user experience during communication sessions, such as video conferences. Participants who would otherwise be identified by numbers or other non-name identifiers, like those who are using devices that connect to the communication session via a telephone service, may not be identified by name. A name recognition module may detect when a name is spoken for a participant. A transcriber module may transcribe the name. A signal representing the name may be provided to the communication devices in the communication session in order that the participant may be identified by name.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media. The term "non-transitory" may indicate that the storage medium is not embodied in a carrier wave or a propagated signal. In certain examples, a non-transitory storage medium may store data that can, over time, change (for example, in RAM or cache).

Various aspects of the disclosure have been described. Aspects or features of examples described herein may be combined with any other aspect or feature described in another example. These and other embodiments are within the scope of the following claims.

The invention claimed is:

1. A method comprising:
    establishing, by a computer having at least one processor and a memory, a communication session for multiple communication devices, wherein:
        at least two communication devices of the multiple communication devices participate in the communication session as video communication devices,
        each video communication device is configured to provide audio and video for the communication session,
        each video communication device is configured to receive audio and video for the communication session,
        at least one communication device of the multiple communication devices participates in the communication session as an audio communication device, and
        each audio communication device is configured to provide and receive audio, but not video, for the communication session;
    connecting a first video communication device to the communication session;
    connecting a second video communication device to the communication session;
    receiving a request to connect an audio communication device to the communication session;
    connecting the audio communication device to the communication session;
    receiving encoded speech from the audio communication device;
    performing speech recognition on the encoded speech to obtain speech-recognized text;
    comparing the speech-recognized text to one or more names stored in a names database;
    adjusting the speech-recognized text based at least in part on the comparison to generate output text associated with the speech-recognized text; and
    providing the output text to at least one of the first and second video communication devices for visual identification of the audio communication device.

2. The method of claim 1, wherein the output text associated with the speech-recognized text comprises the speech-recognized text.

3. The method of claim 1, wherein the names database further includes phone numbers associated with the one or more names.

4. The method of claim 3, further comprising:
    determining a phone number of the audio communication device;
    querying the names database to discover at least one name associated with the phone number of the audio communication device;
    comparing the speech-recognized text to the at least one name associated with the phone number; and
    creating the output text associated with speech-recognized text by modifying the speech-recognized text based on the comparison of the speech-recognized text to the at least one name associated with the phone number.

5. The method of claim 1, further comprising:
    detecting a spoken name associated with the audio communication device, wherein the encoded speech comprises the spoken name.

6. The method of claim 5, wherein detecting the spoken name further comprises:
   detecting a group of sounds spoken during the communication session;
   comparing the group of sounds to one or more patterns of sounds stored in a computer-readable storage medium, wherein each pattern is associated with a phrase that comprises a name placeholder in a position of the phrase;
   selecting a pattern of the one or more patterns that approximately matches the group of sounds; and
   extracting sounds from the group of sounds that are positioned in the group of sounds at approximately the same position as the name placeholder.

7. The method of claim 5, wherein the speech-recognized text comprises a transcription of the extracted sounds.

8. The method of claim 5,
   wherein detecting a spoken name further comprises:
      detecting a first instance of the spoken name; and
      detecting a second instance of the spoken name;
   wherein performing speech recognition on the encoded speech to obtain the speech-recognized text further comprises:
      performing speech recognition on the first instance of the spoken name to obtain first speech-recognized text; and
      performing speech recognition on the second instance of the spoken name to obtain second speech-recognized text;
   the method further comprising:
   combining the first speech-recognized text and the second speech-recognized text to generate the output text, wherein the output text is associated with the first and the second speech-recognized text.

9. The method of claim 1, further comprising:
   signaling, by the computer, the audio communication device to output a request to provide the spoken name.

10. The method of claim 1, further comprising:
    Signaling the audio communication device to prompt a participant of the communication session to provide permission to store the output text in a computer-readable storage medium accessible by the computer; and
    storing the output text in the computer-readable storage medium after the communication session has ended only when the participant provides permission to store the output text to the computer.

11. The method of claim 1, wherein receiving the request to connect the audio communication device to the communication session further comprises:
    calling, by the computer, a phone number associated with the audio communication device in order to connect the audio communication device to the communication session through a telephone service.

12. The method of claim 1, wherein the communication session is a first communication session and the audio communication device is a first audio communication device, the method further comprising:
    storing, by a storage device of the computer, a first voice sample of a participant received from the first audio communication device connected to the first communication session, wherein the output text is associated with the first voice sample;
    terminating the first communication session;
    initiating a second communication session with at least a second audio communication device;
    receiving a second voice sample from the participant received from the second audio communication device connected to the second communication session;
    comparing the first voice sample with the second voice sample from the second audio communication device; and
    sending, by the computer, the output text to at least a third communication device connected to the second communication session when the second voice sample matches the first voice sample within a selected threshold level.

13. The method of claim 12, wherein the names database further comprises phone numbers associated with the one or more names, the method further comprising:
    querying the names database to determine at least one name associated with a phone number of the audio communication device; and
    when two or more names are associated with a phone number of the audio communication device, selecting one of the two or more names based a comparison between the encoded speech with one or more stored voice samples associated with the two or more names.

14. A method comprising:
    establishing, by a computer having at least one processor and a memory, a communication session for multiple communication devices, wherein:
       at least two communication devices of the multiple communication devices participate in the communication session as video communication devices,
       each video communication device is configured to provide audio and video for the communication session,
       each video communication device is configured to receive audio and video for the communication session,
       at least one communication device of the multiple communication devices participates in the communication session as an audio communication device, and
       each audio communication device is configured to provide and receive audio, but not video, for the communication session;
    connecting a first video communication device to the communication session;
    connecting a second video communication device to the communication session;
    receiving a request to connect an audio communication device to the communication session;
    connecting the audio communication device to the communication session;
    receiving encoded speech from the audio communication device;
    performing speech recognition on the encoded speech to obtain speech-recognized text;
    providing output text associated with the speech-recognized text to at least one of the first and second video communication devices for visual identification of the audio communication device; and
    sending at least one signal comprising an audio representation of the speech-recognized text to the audio communication device for output by the audio communication device.

15. The method of claim 14, further comprising:
    receiving, by the computer, one or more signals corresponding to a correction to the speech-recognized text from the audio communication device; and
    modifying the output text based on the correction to the speech-recognized text.

16. A computing device, comprising:
one or more processors;
a network interface to connect to a communication session,
  wherein the communication session connects one or more video communication devices and one or more audio communication devices to the computing device,
  wherein each video communication device is configured to provide and receive audio and video for the communication session,
  wherein each audio communication device is configured to provide and receive audio, but not video, for the communication session, and
  wherein the one or more processors are configured to:
    detect a spoken name associated with at least one audio communication device;
    transform the detected spoken name into speech-recognized text;
    compare the speech-recognized text to one or more names stored in a names database;
    adjust the speech-recognized text based at least in part on the comparison to generate output text associated with the speech-recognized text; and
    provide the output text to at least one of the video communication devices for visual identification of the audio communication device.

17. The computing device of claim 16, further comprising:
one or more storage devices, wherein the names database is stored in one of the one or more storage devices, and wherein the names database indicates names associated with the communication devices.

18. A computer-readable storage medium comprising instructions for causing at least one programmable processor to perform operations comprising:
  establish, by a computer having at least one processor and a memory, a communication session between multiple communication devices, wherein:
    at least two communication devices of the multiple communication devices participate in the communication session as video communication devices,
    each participating video communication device is configured to provide audio and video for the communication session,
    each video communication device is configured to receive audio and video for the communication session,
    at least one communication device of the multiple communication devices participates in the communication session as an audio communication device, and
    each participating audio communication device is configured to provide and receive audio, but not video, for the communication session;
  receiving encoded speech from at least one of the communication devices, wherein the encoded speech relates to an identifier for the audio communication device;
  performing speech recognition on the encoded speech to obtain speech-recognized text;
  comparing the speech-recognized text to one or more names stored in a names database;
  adjusting the speech-recognized text based at least in part on the comparison to generate output text associated with the speech-recognized text; and
  providing the output text to at least one of the video communication devices for visual identification of the audio communication device.

19. The computer-readable storage medium of claim 18, further comprising instructions for causing at least one programmable processor to perform operations comprising:
  sending at least one signal comprising an audio representation of the speech-recognized text to the audio communication device for output by the audio communication device.

20. The computer-readable storage medium of claim 19, further comprising instructions for causing the at least one programmable processor to perform operations comprising:
  receiving, by the computer, one or more signals corresponding to a correction to the speech-recognized text from the audio communication device; and
  modifying the speech-recognized text based on the correction to generate the output text.

* * * * *